United States Patent [19]
Chaney

[11] 3,803,915
[45] Apr. 16, 1974

[54] FOOD PREPARING THERMOMETERS

[76] Inventor: John L. Chaney, 156 Broad St., Lake Geneva, Wis. 53147

[22] Filed: Aug. 21, 1972

[21] Appl. No.: 282,282

[52] U.S. Cl. .................................. 73/376, 206/16.5
[51] Int. Cl. ............................................. G01k 1/14
[58] Field of Search ...................... 73/371, 376, 374; 206/16.5; 215/47

[56] References Cited
UNITED STATES PATENTS

| | | | |
|---|---|---|---|
| 3,636,770 | 1/1972 | Chaney | 73/376 |
| 1,614,807 | 1/1927 | Stewart | 206/16.5 |
| 2,927,709 | 3/1960 | Hoffman et al. | 215/47 |
| 3,636,769 | 1/1972 | Chaney | 73/371 |
| 3,164,279 | 1/1965 | Towns | 215/47 |

Primary Examiner—Richard C. Queisser
Assistant Examiner—Daniel M. Yasich
Attorney, Agent, or Firm—Biebel, French & Bugg

[57] ABSTRACT

A food preparing thermometer in which the scale card and thermometer tube are held in proper position and against movement relative to an outer protective tube by means of a plastic cap having a central inner portion releasably engaging the upper end of the thermometer tube.

3 Claims, 2 Drawing Figures

PATENTED APR 16 1974 3,803,915
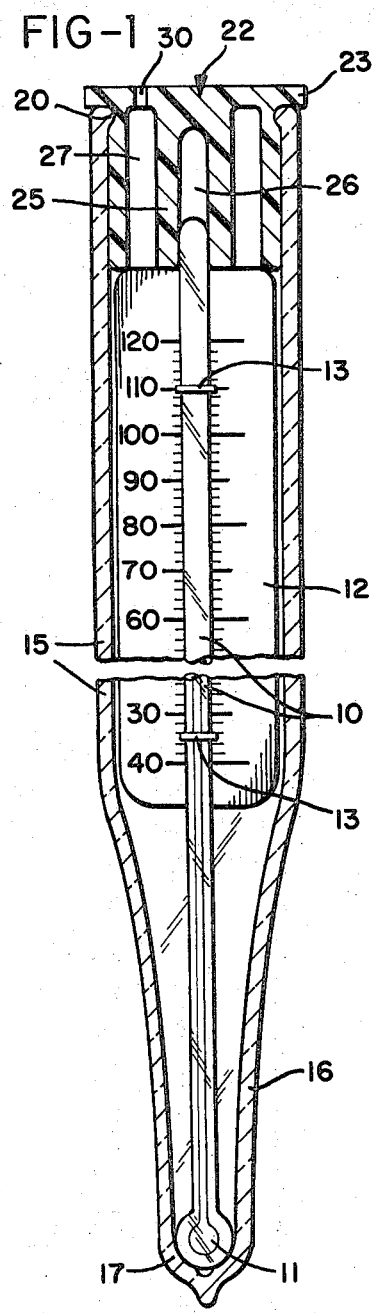
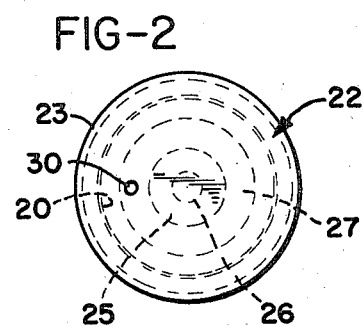

FOOD PREPARING THERMOMETERS

BACKGROUND OF THE INVENTION

Foor preparing thermometers make use of an outer protective tube so that they can be immersed in the food being cooked, for example, cheese, candy, deep fat, etc. The upper end of the protective tube may be enclosed by a plastic cap as described in my U.S. Pat. No. 3,636,769 which will release internal air pressure if the thermometer should be placed in a hot oven and thus avoid the possibility of an explosion. Also, my U.S. Pat. No. 3,636,770 shows a thermometer construction in which the thermometer tube and scale card are properly held in place without using a tin anchor.

SUMMARY OF THE INVENTION

In accordance with the present invention the food preparing thermometer uses a plastic cap fitting inside the protective tube rather than on the outside thereof, and the cap is formed with a central recessed portion adapted to receive the upper end of the thermometer tube to center and hold the card and tube against movement in the protective tube. The central portion of the cap may also lightly engage the upper end of the card, thus assisting in keeping the bulb of the thermometer in good thermal contact with the bottom wall of the protective tube.

BRIEF DESCRIPTION OF THE DRAWINGS

FIG. 1 is a view partly in elevation and partly in section showing my new thermometer construction; and
FIG. 2 is an end view of the top of the cap.

DESCRIPTION OF THE PREFERRED EMBODIMENTS

Referring to the drawings, the thermometer tube is shown at 10 having the usual bulb 11 at its lower end. The tube is fastened to the graduated card by means of fasteners 13. An outer protective tube 15 is provided which fully encloses the thermometer tube and card, its internal diameter being slightly larger than the width of the card to minimize the possibility of movement or vibration of the card within the protective tube. The protective tube has its lower end 16 of reduced diameter and the lower portion 17 thereof is rounded to correspond with the shape of the thermometer bulb and thus establish good heat transmitting contact over a substantial area.

At its upper end protective tube 15 is formed with a small inwardly projecting bead 20. This can be done by heating the open end of tube 15 briefly in a flame. The open end of tube 15 is closed by a cap 22 of suitable plastic material such as polyethylene. The cap is inserted inside the tube 15 and preferably in a heated condition. The presence of bead 20 results in the formation of an annular groove, around the upper part of the cap which upon cooling, tends to keep the cap in place under friction while allowing it to be pulled off when desired. The cap has an upper end flange 23 which can be grasped for effecting removal.

Centrally on the inside of the cap there is a portion 25 extending into the tube 15 in the form of a neck having a central recess 26 therein. The purpose of the recess is to receive the upper end of the thermometer tube 10 which projects above the upper end of the card 12. The recess is made slightly smaller than the end of the tube 10 so that it will be frictionally received therein. The presence of annular groove 27 in the cap further provides for flexibility in the wall of the recess. It may for example have a diameter of 0.130 inch while the diameter of the thermometer tube is of the order of 0.140 inch. The relative size of the thermometer tube 10 and recess 26 is such that the tube will be held in proper position by frictional engagement and likewise will be held with its bulb 11 in good heat transfer relationship with the lower end 17 of outer tube 15. Further, the inner end of cap 22 may be of such dimensions that its lower end will lightly engage the upper edge of card 12, thereby assisting of holding the thermometer tube and card 12 against relative motion in tube 14 and with bulb 11 in good contact with the lower end 17 of tube 15.

To provide for ready release of internal air pressure and the balancing of air pressure inside and outside tube 15, a pin hole 30 is preferably provided in the end of cap 22 thus assuring that the air pressure inside and outside of the tube will at all times remain the same.

In contrast to my U.S. Pat. No. 3,636,770, no centering disc is required and although the tin anchor has been eliminated, no resilient material such as disclosed in that patent is used. The arrangement involves only one element, namely cap 22, and is thus simple, easy to assemble, and inexpensive.

What is claimed is:
1. A thermometer comprising:
   a. an outer protective tube having an open upper end, an upper portion of substantially constant diameter extending downwardly from said open upper end, and a lower portion tapering inwardly to a closed lower end,
   b. a resilient cap received in said open upper end of said protective tube,
   c. said cap having an outer, substantially cylindrical wall projecting inwardly of said open upper end of said protective tube and frictionally engaging inner surfaces of said upper end of said protective tube, and an inner substantially cylindrical wall extending in spaced, substantially concentric relationship to said outer cylindrical wall,
   d. said inner substantially cylindrical wall defining a substantially centrally located socket and an annular groove between said inner and outer walls,
   e. portions of said outer protective tube adjacent said upper end thereof cooperating with portions of said cap to resist withdrawal of said cap from said tube,
   f. a sealed thermometer tube having an enlarged bulb at its lower end,
   g. said thermometer tube being received in said protective tube with said bulb in heat transferring contact with but free from attachment to said closed lower end of said protective tube,
   h. a scale card attached to said thermometer tube with an upper end of said scale card spaced from said upper end of said thermometer tube, and
   i. said upper end of said thermometer tube being received in said substantially centrally located socket defined by said inner substantially cylindrical wall of said cap and frictionally engaged in said socket with said thermometer tube being positioned in substantially concentric relationship to said outer protective tube with said bulb held in contact with said lower end of said protective tube solely by said engagement with said cap.

2. The thermometer of claim 1 further comprising:
a. means defining an internal, inwardly projecting bead at said upper end of said protective tube frictionally engaging an outer surface of said outer cylindrical wall and causing a permanent set therein to retain said cap in said outer protective tube.

3. The thermometer of claim 1 further comprising:
a. means defining a hole through said cap to allow pressure equalization between the inside and outside of said protective tube.

* * * * *